Feb. 22, 1949.　　　G. R. HAMEL　　　2,462,492
MULTICYLINDER ENGINE
Filed April 7, 1945　　　　　　　　　4 Sheets-Sheet 3

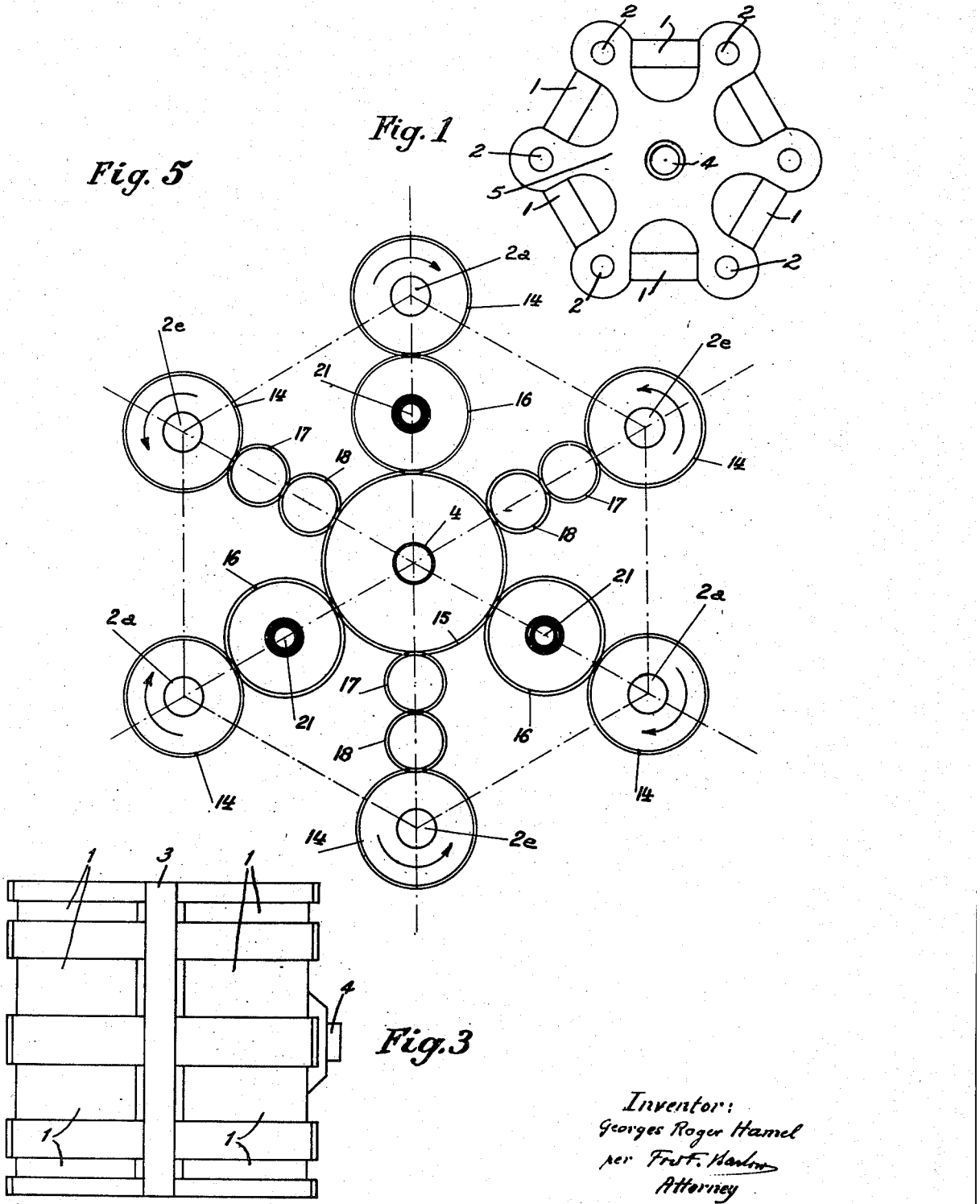

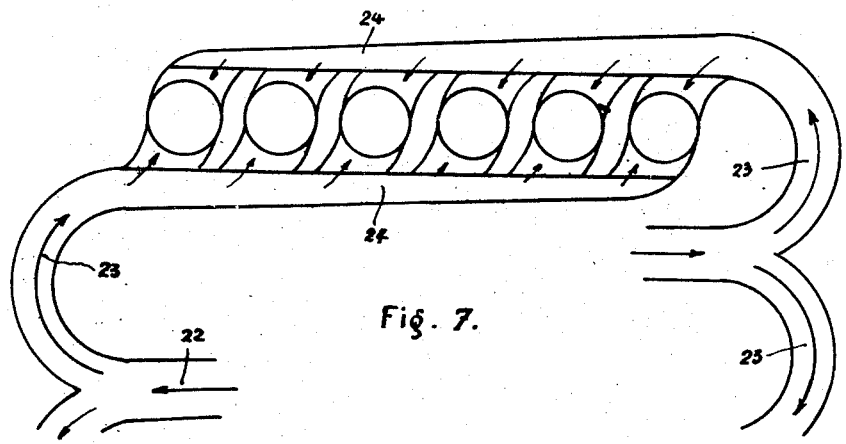
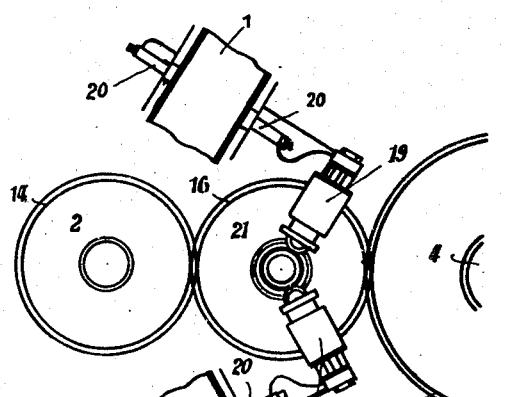
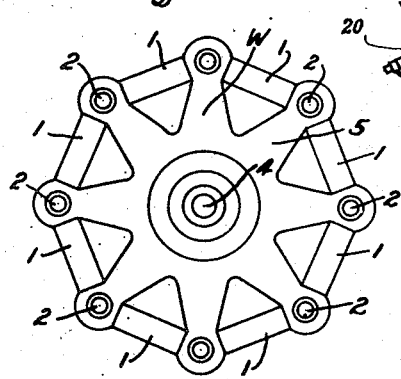

Inventor:
Georges Roger Hamel
per Fred F. Harlow
Attorney

Feb. 22, 1949. G. R. HAMEL 2,462,492
MULTICYLINDER ENGINE
Filed April 7, 1945 4 Sheets-Sheet 4

Inventor:
Georges Roger Hamel
per Fred F. Hadow
Attorney

UNITED STATES PATENT OFFICE 2,462,492

MULTICYLINDER ENGINE

Georges Roger Hamel, Paris, France

Application April 7, 1945, Serial No. 587,171
In France August 24, 1942

Section 1, Public Law 690, August 8, 1946
Patent expires August 24, 1962

5 Claims. (Cl. 123—51)

This invention relates to improvements in internal combustion engines, and more particularly to improvements in multicylinder engines.

Owing to the constant increase in tonnage and speed of aircraft, seacraft, railroad trains and other vehicles, it is important to employ engines of reduced weight and of ever increasing power.

It is known that two solutions to the problem of increasing the power of an engine are possible. According to the first solution, the size of each cylinder is enlarged in order to obtain a larger cylinder volume. But this has its limitations because an increase in the size of the cylinder bore and of the piston stroke unavoidably produces mechanical stresses, as well as other disadvantages resulting from the heating of the movable members of said engine which in turn cause a decrease in the speed of rotation of which said engine is capable, the available power increasing, for that reason, at the expense of a proportionately greater increase in weight.

In view of the aforementioned disadvantages it becomes necessary to consider another solution, namely, the multiplication of the cylinders operating in connection with the same shaft. For that reason, engines comprising from twelve to twenty-four cylinders, and even in certain embodiments up to forty-two cylinders, have been constructed in recent years.

The present invention, objects of which will be described herein, offers considerable advantages over former embodiments, for it permits, if so desired, the fitting of several hundreds of cylinders on the same shaft, thereby providing engines of very high power and of relatively less weight, owing to the fact that such engines may be operated with cylinders of less volume. The advantages of high speed engines may thus be retained, which was hitherto possible only with engines much less powerful than those which may now be realized by the application of the present invention.

The principal feature of the engine of low weight, which constitutes the solution of the above-mentioned problem and hereinafter described, includes the combination of several rows of cylinders disposed parallel to each other in each row, said rows being positioned along the sides of a regular polygon having an even number of sides (hexagon, octagon, decagon, and so on) and the various members, which are set in motion, being balanced in order to avoid any external reaction other than the power to be utilized.

According to the invention, the groups of cylinders are set along the sides of a polygon having $2n$ sides, each group comprising $n$ cylinders and each cylinder being provided with two pistons running in opposite directions. Two crankshafts are provided for each group which constitutes a whole aggregate operating according to the well known two-stroke cycle. Each of said cylinders is provided with a plurality of intake and exhaust ports disposed in two circles in such a manner that the respective pistons uncover said intake and exhaust ports when they reach the end of their stroke. The crankshafts consequently form the sides of a polygon.

Another feature of the invention lies in the fact that the rows of cylinders are secured on a single star-shaped frame comprising several branches and constituting with said cylinders a very stiff and rigid triangular aggregate, said frame supporting the bearings of said crankshafts which transmit their movements by any suitable kinematic device to any main shaft disposed in the center of the motor unit along an axis of symmetry, said axis being the same for each row of cylinders.

The frame of said engine is made up of a plurality of box-shaped steel plates, welded to each other and comprising a plurality of stars having as many branches as the sides of the above-mentioned polygon. The ends of said branches form supports for the bearings of said crankshafts.

Each group of cylinders forms a triangular element, the base of which is a cylinder block, and the other two sides being the branches of the stars.

In an embodiment hereinafter described, as an example and without limiting the scope of the invention, in a hexagonal-shaped motor, the rows of cylinders are disposed along the six sides of a regular hexagon with the crankshafts arranged at the angles of said hexagon, while the main shaft is situated in the center. The motor set described above with its principal arrangement and according to the various types of embodiments which may be preferred, is characterized also by the following features which may be applied separately or in various combinations:

(a) The main frame is assembled in such a manner that it presents resistant legs disposed along the diagonals of a regular polygon formed by the various rows of cylinders.

(b) For a motor unit of hexagonal type, the frame is in the form of a six-branch star, the ends of which support bearings for six crankshafts; the connecting rods of two sets of pistons, belonging to the cylinders of two adjacent rows, are secured on each of said crankshafts.

The main shaft is situated in the center and each row of cylinders constitutes, with the two adjacent legs of the star-shaped frame, the three sides of a triangle.

(c) For each cylinder, several ports disposed in a circle and bored in the wall of said cylinder are provided for the intake of air and for the exhaust of spent gases.

(d) The crankshafts situated at the ends of the legs of said frame are alternately connected with the pistons on the side of the exhaust ports, and pistons on the side of the intake ports, the former, that is to say the crankshafts situated on the side of the exhaust means running in one direction, and the latter, that is to say the crankshafts situated on the side of the intake means running in the reverse direction.

(e) The feeding of each cylinder may be effected, either by injecting fuel in said cylinder or by means of a previous carbureting of the air to be introduced.

(f) The air for scavenging the gases may be supplied by a set of compressors disposed on one side of the motor group; said compressors may be driven by the above-mentioned crankshafts which operate said compressors by their end situated on the opposite side with regard to that in connection with the main shaft.

(g) The cylinders in each row may receive the air necessary to feed the engine and to scavenge the gases by means of two pipes situated on either side of each row and each fed in reverse direction, in order to counterbalance the losses of pressure which occur in said pipes and in order to introduce the same volume of air in the various cylinders in each row.

In the accompanying drawings showing, by way of example, an embodiment of the invention—

Figure 1 is a diagrammatic view of a hexagonal engine;

Figs. 2 and 3 illustrate diagrammatically an octagonal engine comprising 64 cylinders, said cylinders being disposed in rows of eight along the sides of the octagon and symmetrically with regard to the central gearing box;

Figure 8:
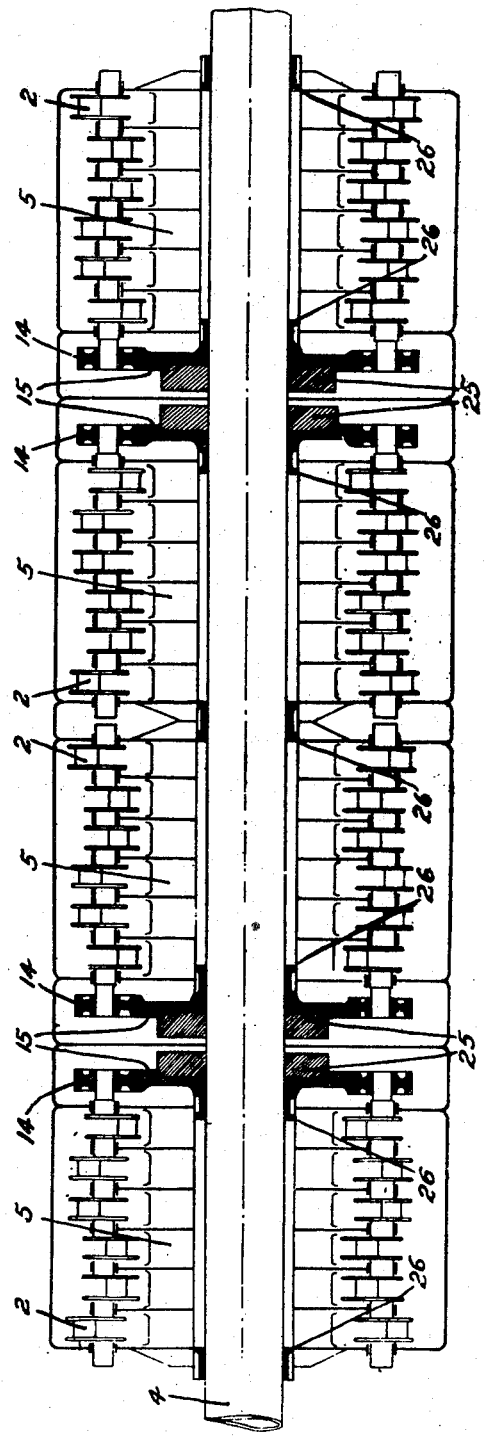

Fig. 5 diagrammatically illustrates an example of a kinematic connection secured by means of straight gearings between the various crankshafts and the main central shaft;

Fig. 6 illustrates an example of a means which may be adopted to supply fuel to the various rows of cylinders;

Fig. 7 is a diagrammatic view which illustrates the manner in which the various cylinders in a row receive air;

Fig. 8 is also a diagrammatic view which shows the manner in which the elementary motor units are connected to the central shaft.

According to said drawings, the numeral 1 designates the cylinder sets, 2 the crankshafts, and 4 the main shaft.

Crankshafts are connected to the main shaft by means of suitable kinematic devices, preferably by means of straight gearings included in a casing 3 which may be disposed, either at one of the ends, or in the center of said motor unit.

Figure 4:
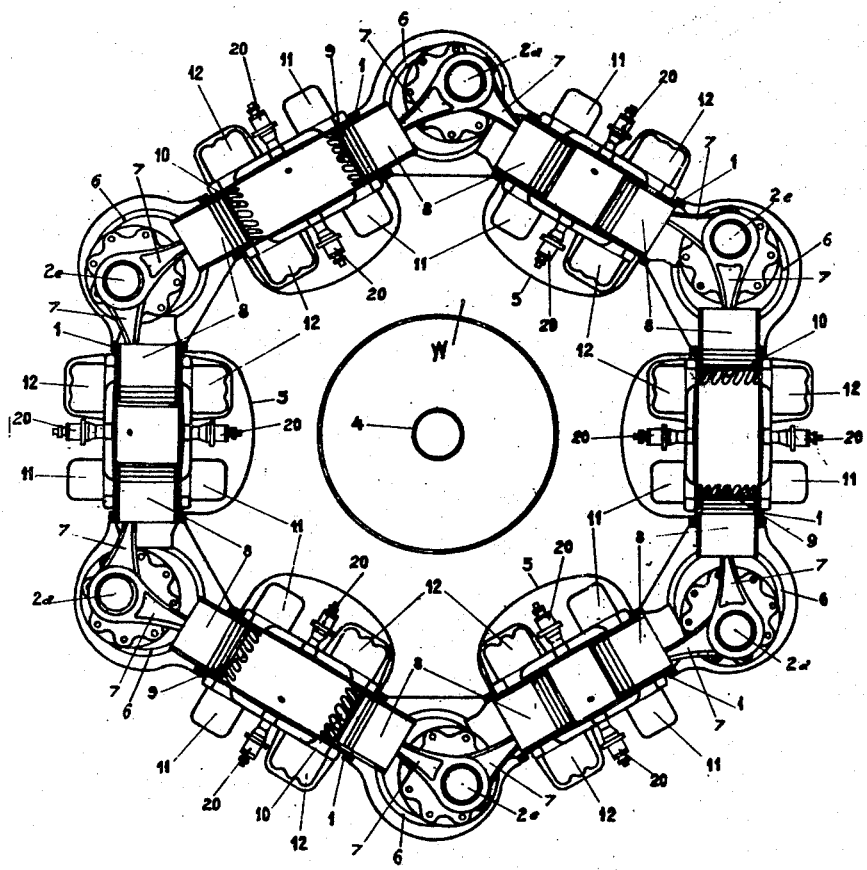
Fig. 4 is a cross section of a hexagonal motor unit taken substantially on a plane running longitudinally through the cylinders in a polygon.

Preferably a suitably shaped frame 5 is used constructed of any material considered suitable for that purpose. The casings may be made of steel sheets and laminated bars, such as L-shaped, U-shaped bars, and so on, which form finally a series of boxes assembled together by welding. In order to understand the invention more perfectly, it may be advantageous to consider especially the particular embodiment illustrated in Figs. 4, 5 and 6.

Frame 5 has the form of a six-branch star, as illustrated in Fig. 1, where the ends of said branches support the bearings 6 of the crankshafts 2 to which are connected the rods 7 of two sets of pistons 8 whose cylinders are situated in two adjacent rows. Each series of cylinders constitutes with the two adjacent branches of the frame, a triangle and, finally, the juxtaposition of these six triangles imparts to the whole of the motor unit a resistance and rigidity very much greater than is usually obtained. In each cylinder 1, two pistons 8 move in opposite directions in order to constitute, owing to intake ports 9 and exhaust ports 10 bored in the wall of each cylinder about the ends of said cylinders, a single-acting motor element which works according to a two-stroke cycle.

Pistons uncover in due time the ports 9 and 10 of each cylinder which are put in communication respectively with an intake pipe 11 and an exhaust pipe 12.

The three crankshafts 2a are connected with the pistons on the intake end and the three crankshafts 2e are connected with the pistons on the exhaust end. Each of said crankshafts which are six in number, bears a spur wheel 14 the diameter of which is the same for each of the six crankshafts and which permits connection of said crankshafts 2 to a large toothed crown wheel 15 (Fig. 5) constituting a stepped-down gearing and mounted on a main shaft 4 situated in the middle of the central portion of the star-shaped frame or supporting plate.

The connection between the spur wheel 14 of the crankshaft 2 and the crown wheel 15 of the central shaft is effected as follows:

The spur wheels 14 of the three crankshafts 2a, situated on the intake side, are each meshed with a single idler 16 having the same diameter, which in turn is meshed with a crown wheel 15.

The spur wheels 14 of the crankshaft 2e, situated on the exhaust side, are rotated in a direction opposite to that of the crankshafts 2a disposed on the intake side, by means of two intermeshed idlers 17 and 18. Thus a more perfect balance of parts is obtained.

Reactions which arise as a consequence of the pressure exerted in each cylinder by ignition are counterbalanced also, because the crankshafts and cam shafts, which control the pumps provided for injection, are disposed in such a manner that, in the three rows of cylinders, situated in three angular positions separated one from another by an angle of 120°, the various elements operate simultaneously. Should a stress arise in a cylinder of the vertical row situated on the left, for instance, a similar stress would arise in the two corresponding cylinders on the right. Since said three cylinders are mutually counterbalanced, twelve triple ignitions will take place for each turn of the crankshaft, in the case of an engine comprising six rows of cylinders, which gives rise to the maximum stress for each angular position of said crankshafts separated from each other by an angle of 30°. As the crankshafts designed to operate the intake means pass over the neutral position (or dead center) with an angular shifting of 15° with regard to those designed to operate the exhaust, it results from such a disposition that a double maximum of torque takes place at any angular position separated by angles of 15°. Consequently variations of the driving couple are reduced and two important results are thus obtained, namely: on the one hand, the counterbalancing of the reactions which arise as a consequence of the combustion pressure and, on the other hand, the obtaining of an almost constant driving couple, which ensures for the whole engine a very smooth and regular operation under improved conditions.

Moreover, all the arrangements advantageous for improving the regularity of operation have been designed systematically in the motor unit, as will be noted hereinbelow:

Fuel may be supplied to each cylinder by means of a pump 19 (Fig. 6) which delivers said fuel to two injectors 20. Consequently each cylinder may receive a full supply of fuel needed for its normal operation, even if an injector becomes clogged. Pumps 19 are mounted in six rows and are operated by the three cam shafts 21, disposed in the star-shaped frame. Said cam shafts are fastened on the intermediary pinions which connect the admission crankshafts with the large gear wheel 15 (Fig. 5).

Consequently three shafts may be sufficient to operate the thirty-six pumps of the motor unit comprising six rows of six cylinders each, described here as a particular example. According to such an arrangement, it results that each cylinder is consequently provided with its particular pump adjacent thereto. Piping which establishes connections between pumps and injectors is therefore considerably shortened and, moreover, said piping is similar for all cylinders, which counterbalances the losses of pressure and ensures the maximum of regularity in the operation of said engine, as pointed out above.

The air employed to scavenge the spent gases is delivered by a set of compressors (not shown) which may be disposed on each side of the motor unit and driven by the axle of said crankshafts by suitable means. Said compressors may be either of well-known usual type (compressors operating by means of pistons), or of the well-known centrifugal type; moreover, in consequence of the crankshaft's ends being in their proximity, it becomes very easy to drive said compressors, either directly or by means of stepping-up gearings.

Said compressors deliver air under pressure, at each end of the middle body of the engine, in a manifold 22 which is divided into two branches 23 (Fig. 7), each branch feeding the pipes 24 connected with two rows of cylinders. Since each row of cylinders is provided with two pipes 24 designed for introducing air in said cylinders, the one outwardly and the other inwardly with regard to the motor unit, such an arrangement ensures quite a uniform distribution of air in the various groups of cylinders taken together.

The cylinder which lies in the most remote position from the inlet of one piping 24 is situated, in fact, in the nearest position with regard to the inlet of an opposite piping 24.

The losses of pressure in said piping are consequently counterbalanced and the rate of the feeding of fuel remains almost constant for the whole set of cylinders. This unformity, as well as the regularity in the introduction of air, contribute towards ensuring the most regular operation of the engine.

All that has been said above regarding the hexagon-shaped engine may be applied equally to other types of engines, whose cylinders are disposed in various rows along the sides of a polygon, the central frame of said engine being substantially star-shaped and comprising as many branches as are necessary.

It is preferable to have a polygonal arrangement in which the polygon has an even number of sides, so that the number of intake crankshafts may alternate with an equal number of exhaust crankshafts. It is thus possible, consequently, to constitute engines with several rows of cylinders disposed along the sides of a hexagon, of an octagon, of a decagon and so on; such a construction makes possible engines that develop several thousands of H. P., perfectly balanced and with a cylinder volume considerably reduced, which ensures the most favorable conditions of operation with respect to thermo stresses and to mechanical efficiency.

In consequence of the fact that the main shaft lies exactly along the axis of symmetry of the engine and that the central part of the frame, where said shaft is positioned, is entirely free from any other element, it becomes possible, according to the arrangement adopted for such engine, as described above, to construct engines of very small weight and very high power, by mounting several of the motor units mentioned above on the same main shaft and by coupling them therewith. Fig. 8 shows an example of such an embodiment. According to that example, four motor units of the above described type are connected together at the end frames 5 of each unit. Through the center of said frame passes the main shaft 4, supported and guided by bearings 26. Each of crankshafts 2 drives, by means of pinions 14, a gear wheel 15 which may either run freely round the main shaft on which it is loosely mounted, or be joined with said shaft by means of clutches 25, which may be mechanical, hydraulic or magnetic.

It is thus possible to obtain a motor unit of very high power, various parts, or elementary groups of which, may be put into service, either simultaneously or separately.

Each engine, disposed as above indicated, forms consequently a ring which remains free within its circumference, such ring being situated on a central shaft which may be connected with as many groups of motor units as it is required to obtain the total power which may be desired.

In order to reduce the weight of said motors as much as possible, it is advantageous to provide two motor units on both sides of a common stepped-down gearing lodged in a central casing.

It is also expedient to set, in a common central casing, two independent stepped-down gearings, one for each motor unit, with a mechanical, hydraulic, or magnetic device for engaging or disengaging the one or the other of said motor units—or both—and the central shaft according to circumstances.

It is equally possible to provide for a series of elements cooperating with the same central shaft, as described above, which permits of mounting in series 2, 4, 6 or 8 N motors according to that arrangement.

The advantage of such a disposition consists in the fact that it would be necessary to set going, by usual means, only a single unit, the others being put in motion by successive coupling, and in fact that 2 N motors running at a very high speed may be connected with a common shaft which runs at a lower speed. Moreover, with such a disposition, it is possible either to utilize the whole appliance with its full power, or to reduce said power according to circumstances, by stopping successively the number of motor units, as desired, which reduces also consequently the consummation of fuel. Should one of said motor units be damaged, it is possible to stop such unit without stopping the others and to make the necessary repairs or to change the damaged members without stopping the remainder of the groups delivering the available power.

It is equally possible to dispose on the same central shaft one, or several motor units running in opposite directions with respect to each other, in order to permit the control of a ship by disengaging the motors running in one direction and coupling the motors running in the reverse direction.

Finally, the invention permits of constructing engines of high power and of reduced weight, on very favorable terms, since said engines may be constituted of a plurality of simple elements, of reduced weight, standardized, readily interchangeable, and at a very low cost. Said engines are readily accessible, and ensure easy mounting as well as dismounting of the various elements. The bulkiness of said engines is particularly reduced, which makes possible their utilization in aerial traffic, as well as for high-seas navigation and for the operation of railways.

It is obvious that the embodiments described and illustrated above are presented only as mere examples without limiting the field of the invention and that they are susceptible of modification which does not change without departing from the spirit and scope of the present invention.

Having thus described my invention, what I claim is:

1. A polyhedral engine unit comprising a plurality of cylinders defining a polygon, a driven shaft coinciding with the axis of the polygon, opposed pistons in each cylinder, a crankshaft at each vertex of the polygon and connected to adjacent pistons, a rigid supporting plate having a center portion through which the driven shaft passes and having radiating arms extending to the vertices of the polygon at the end of each of which is supported a crankshaft, said frame maintaining said crankshafts and cylinders rigidly spaced relative to the driven shaft and relative to each other.

2. A polyhedral engine unit comprising an even number of cylinders greater than two, defining a polygon, a driven shaft coinciding with the axis of the polygon, opposed pistons in each cylinder, a crankshaft at each vertex of the polygon and connected to adjacent pistons, a rigid supporting plate having a center portion through which the driven shaft passes and having radiating arms extending to the vertices of the polygon at the end of each of which is supported a crankshaft, said frame maintaining said crankshafts and cylinders rigidly spaced relative to the driven shaft and relative to each other, exhaust means and intake means provided at opposite ends of each cylinder, the cylinder ends having exhaust means being adjacent each other and the cylinder ends having intake means being adjacent each other, and the intake means adjacent one-half the number of vertices alternating with the exhaust means adjacent the other half.

3. A polyhedral engine unit comprising an even number of cylinders greater than two, defining a polygon, a driven shaft coinciding with the axis of the polygon, opposed pistons in each cylinder, a crankshaft at each vertex of the polygon and connected to adjacent pistons, exhaust means and intake means provided at opposite ends of each cylinder, the cylinder ends having exhaust means being adjacent each other and the cylinder ends having intake means being adjacent each other, and the intake means adjacent one-half the number of vertices alternating with the exhaust means adjacent the other half, a spur wheel at each of the vertices driven by the crankshafts, the crankshafts at the exhaust ends of the cylinders driving their spur wheels in one direction and the crankshafts at the intake ends of the cylinders driving their spur wheels in the opposite direction, and gear means meshed with each of said spur wheels for driving said driven shaft.

4. A polyhedral engine unit comprising a plurality of cylinders defining a polygon, a driven shaft coinciding with the axis of the polygon, opposed pistons in each cylinder, a crankshaft at each vertex of the polygon and connected to adjacent pistons, a spur wheel at each of the vertices driven by the crankshafts and meshed with gear means for driving said driven shaft, said gear means including a gear wheel mounted on said driven shaft alternatively for attachment thereto or for loose engagement therewith whereby the said engine unit is rotatable about said driven shaft when said gear wheel is in loose engagement with said driven shaft.

5. In a power installation having a plurality of polyhedral engine units and cylinders in said units arranged in rows, the improvement comprising: a pipe connected to one side of each of the cylinders in a row for conducting air to each of said cylinders in one direction, and a pipe connected to the opposite side of each of said cylinders in said row for conducting air in the opposite direction to each of said cylinders, to provide uniform distribution of air to said cylinders.

GEORGES ROGER HAMEL.

REFERENCES CITED

The following references are of record in the file of this patent:

UNITED STATES PATENTS

| Number | Name | Date |
|---|---|---|
| Re. 17,218 | Kasley | Feb. 19, 1929 |
| 1,634,249 | Lindequist | Jan. 28, 1927 |
| 1,701,360 | Causan | Feb. 5, 1929 |
| 1,814,802 | Herr | July 14, 1931 |
| 1,925,878 | Negel | Sept. 5, 1933 |
| 2,263,202 | Wood | Nov. 10, 1941 |

FOREIGN PATENTS

| Number | Country | Date |
|---|---|---|
| 117,684 | Great Britain | 1918 |
| 632,746 | France | 1928 |